United States Patent [19]

Wille

[11] Patent Number: 4,696,124

[45] Date of Patent: Sep. 29, 1987

[54] DOWNRIGGER FISHING LINE RELEASE APPARATUS

[76] Inventor: Mark E. Wille, 133 Seager Dr., Oconomowoc, Wis. 53066

[21] Appl. No.: 885,175

[22] Filed: Jul. 14, 1986

[51] Int. Cl.⁴ .............................................. A01K 93/00
[52] U.S. Cl. ...................................... 43/43.12; 43/27.4
[58] Field of Search ............................... 43/43.12, 27.4

[56] References Cited

U.S. PATENT DOCUMENTS

| | | | |
|---|---|---|---|
| 2,735,212 | 2/1956 | Baum | 43/43.12 |
| 3,874,110 | 4/1975 | Larson | 43/43.12 |
| 3,916,557 | 11/1975 | Taylor | 43/43.12 |
| 3,959,913 | 6/1976 | Weber | 43/43.12 |
| 4,028,840 | 6/1977 | Wille | 43/43.12 |
| 4,065,869 | 1/1978 | Berry | 43/43.12 |
| 4,199,890 | 4/1980 | Austin | 43/43.12 |
| 4,221,068 | 9/1980 | Roemer | 43/43.12 |
| 4,255,890 | 3/1981 | Smith | 43/43.12 |
| 4,261,130 | 4/1981 | Cudnohufsky | 43/43.12 |
| 4,417,414 | 11/1983 | Hood | 43/43.12 |
| 4,453,336 | 6/1984 | Lowden | 43/43.12 |
| 4,513,524 | 4/1985 | Jolliff | 43/43.12 |
| 4,538,372 | 9/1985 | Petigoretz | 43/27.4 |

Primary Examiner—Kurt Rowan
Attorney, Agent, or Firm—Robert T. Johnson

[57] ABSTRACT

Disclosure is made in this invention of a secondary fishing line release apparatus in downrigger fishing, wherein this secondary fishing line release comprises a line release eye freely slidable on primary fishing line release wire and this secondary line release eye comprising a leg of the line release eye extending through line release loop of line release eye and the line release loop flexes outwardly beyond the leg of the line release eye to free the line extending from the fishing pole to the fish caught on the hook.

1 Claim, 4 Drawing Figures

DOWNRIGGER FISHING LINE RELEASE APPARATUS

EXPLANATION OF INVENTION

When fishing by the method of downrigger trolling, it is important to maintain a tight line when fish strike or take the bait. This is of particular importance regarding larger fish such as salmon, trout and muskellunge for example, since a slack line gives a fish the chance to become unhooked and lost. This invention discloses apparatus to maintain a tight fishing line.

DESCRIPTION OF PRIOR ART

Reference is now made to the following patents.
U.S. Pat. No. 3,874,110. This patent discloses a magnet body in the downrigger line release device.
U.S. Pat. No. 3,959,913. Clothes pin type release mechanism is disclosed in this patent.
U.S. Pat. No. 4,028,840. This patent discloses a trolling ski for outrigger fishing.
U S. Pat. No. 4,199,890. Discloses a fishing line release mechanism of a spring type.
U.S. Pat. No. 4,221,068. This patent discloses a fish line holder, clamp type, for downrigger fishing.
U.S. Pat. No. 4,453,336. This covers a fishing line release mechanism in downrigger fishing. The mechanism consists of a pair of jaws with rubber tips for holding the fishing line.
U.S. Pat. No. 4,513,524. Comprises an adjustable mechanism for releasably connecting a fishing line to a downrigger or outrigger.
U.S. Pat. No. 4,538,372. In this patent a hairpin-like release mechanism is disclosed when a fish is on the line.

SUMMARY OF THE INVENTION

This invention is to disclose fishing line release apparatus from a downrigger line to maintain a taut, or tight, line when hooking a fish.

An object of this invention is to disclose fishing line release apparatus when fishing with conventional downrigger equipment.

Another object of this invention is to disclose fishing line release apparatus when fishing with conventional downrigger or outrigger apparatus consisting of a primary line release, wherein the improvement comprises a secondary line release consisting of a closed steel clip ring and wherein the fishing line is threaded through said closed steel clip ring.

DETAILED DESCRIPTION OF INVENTION

This present invention is useful for releasing of a fishing line when using a trolling ski, downrigger or outrigger, to eliminate slack in a fishing line when a fish is hooked.

Figure 1:
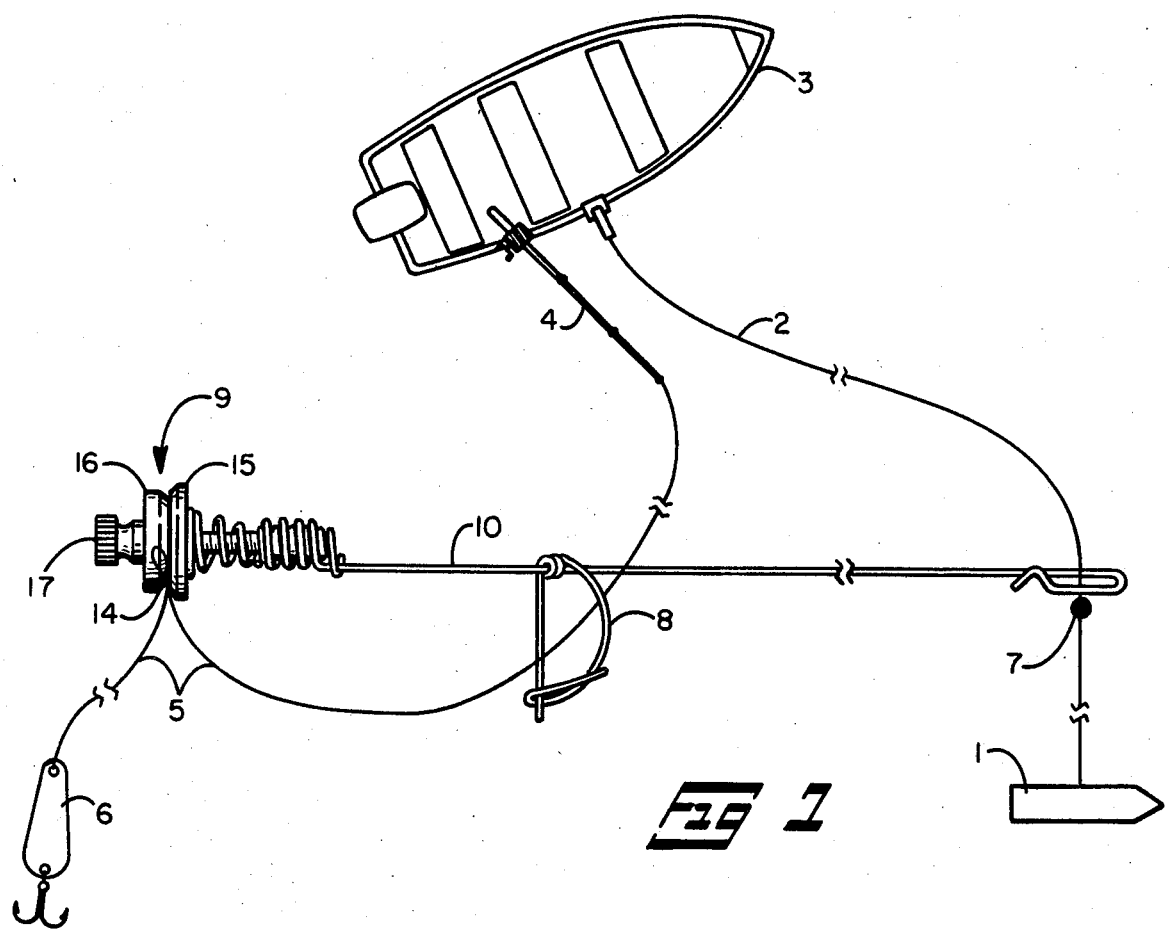
FIG. 1. Elevation view of fishing apparatus assembly wherein:
1. downrigger weight planers
2. towline to downrigger
3. boat
4. fishing rod
5. fishing rod line
6. bait
7. stop for line release apparatus
8. secondary line release
9. primary line release
10. rigid wire
12. secondary line release loop
13. secondary line release leg
14. fishing line loop
15. resilient disc
16. resilient disc
17. adjusting screw for compression between resilient discs 15 and 16
18. compression spring FIG. 2. Enlarged view of line release apparatus:
8. secondary line release
9. primary line release
10. rigid wire
11. fastener hook
12. secondary line release loop
13. secondary line release leg
15. resilient disc
15a. center hole in resilient disc
16. resilient disc
16a. center hole in resilient disc
17. adjusting screw for tension between resilient discs 15 and 16
18. compression spring
18a. compression spring center hole
21. threaded section for adjusting screw
22. winding of secondary line release
23. primary and secondary line release apparatus FIG. 3. Enlarged view of secondary line release wherein:
8. secondary line release
10. flexible wire
12. secondary line release loop
13. secondary line release leg
14. fishing line loop
22. winding FIG. 4. Enlarged view of fishing line released from secondary line release apparatus where:
1. downrigger weight
2. towline
5. fishing rod line
8. secondary line release
10. rigid wire
11. fastener hook
12. secondary line release loop
13. secondary line release leg

Referring to FIG. 1, the overall apparatus is shown for "downrigger" fishing and includes a boat 3 to which towline 2 to downrigger 1 is attached and downrigger weight 1, is fastened to the other end of the towline of downrigger 2. Fishing rod 4 is held in the boat 3 and fishing rod line 5 extends to be threaded through secondary line release 8 and is held in primary line release 9, by inserting a loop 14 of fishing rod line 5 between resilient discs 15 and 16 held in contact with each other by means of screw 17 being tightened against compression spring 18. The above mentioned loop 14 held between resilient discs 15 and 16 is readily pulled out of such mount when a fish takes the bait 6.

The pressure applied to resilient discs 15 and 16, holding loop 14 is controlled by the tightness of screw 17 applied against compression spring 18, and between which resilient discs 15 and 16 are mounted. Screw 17 extends through center holes 15a and 16a of discs 15 and 16, and through compression spring center hole 18a of compression spring 18, and into threaded section 21 which butts against compression spring 18.

Figure 4:
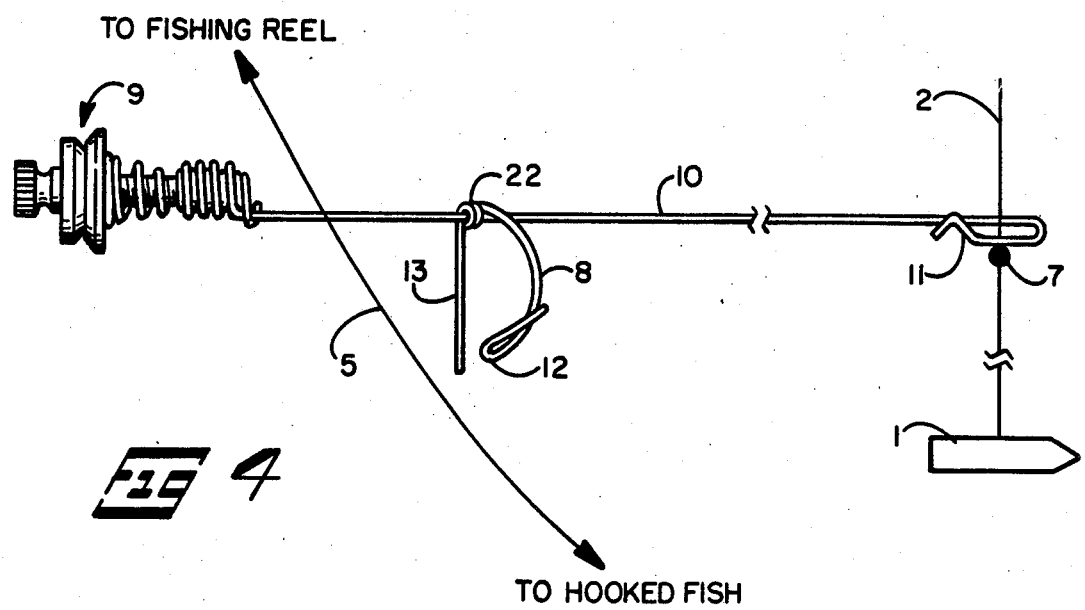

After release of loop 14 of fishing rod line 5 from primary line release 9, the fishing rod line 5 is next released from secondary line release 8, when secondary line release loop 12, is flexed beyond secondary line release leg 13 by the action of the fish being hooked, this secondary line release loop 12 is flexed beyond secondary line release leg 13, see FIG. 4, so that the fishing rod line 5 is free of the primary and secondary release 9 and 8 and the fish on the fishing rod line 5 is in control of the fishing rod 4.

Figure 2:
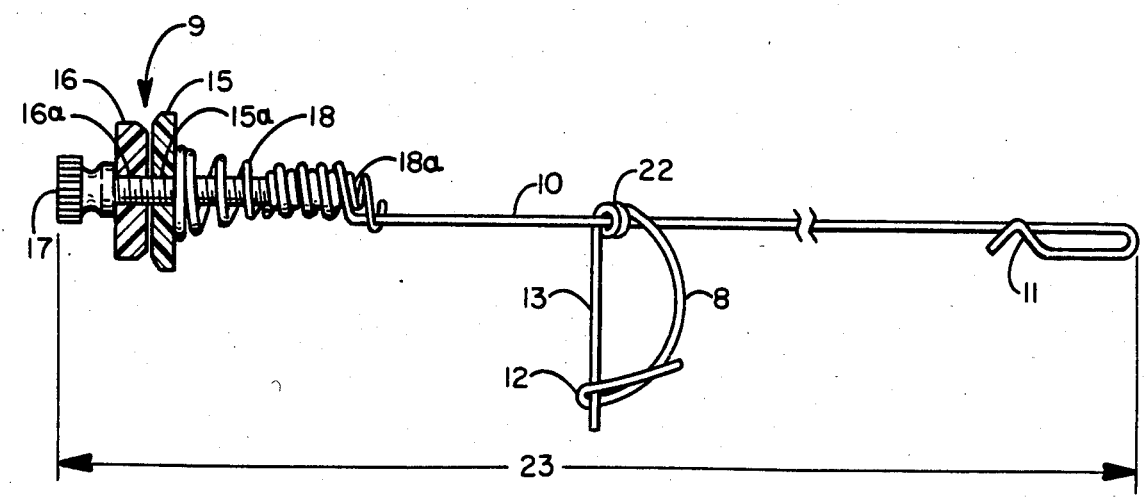
Figure 3:
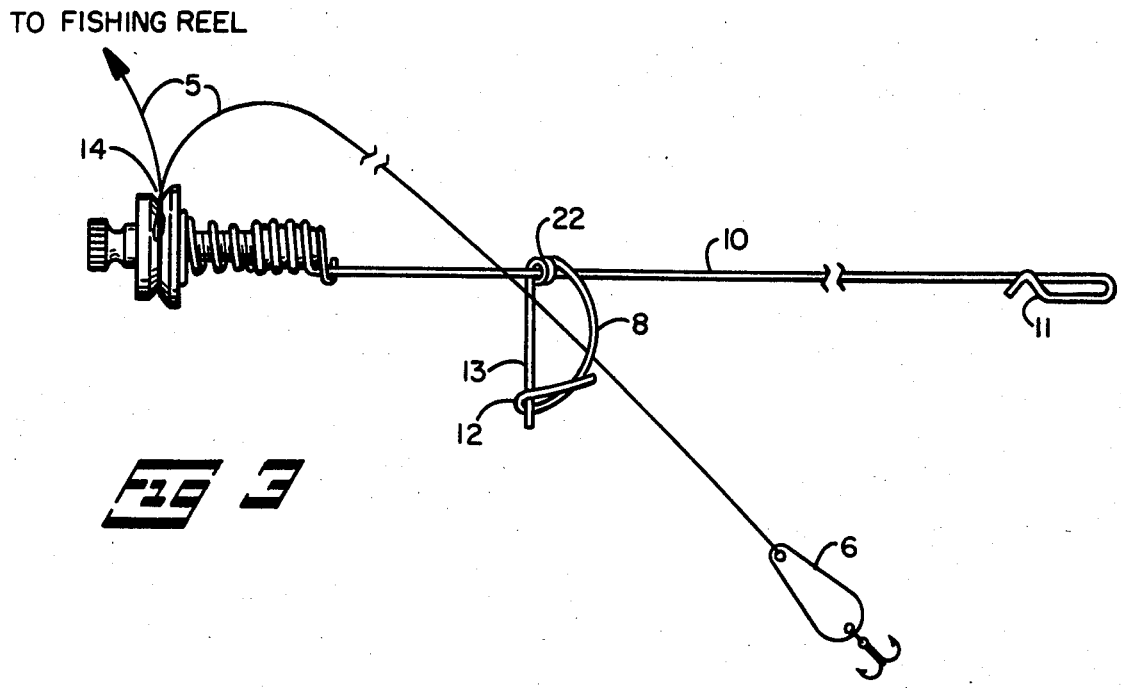

Line release apparatus 23 (see FIG. 2) is comprised of fastener hook 11, on one end of rigid wire 10, primary line release apparatus 9, is mounted on the opposite end of rigid wire 10, rigid wire 10, is preferably made of stainless steel wire and fastener hook 11, developed by bending the end of rigid wire 10. The fastener hook 11 is of such dimension to freely slide on downrigger line 2 to stop 7 for line release apparatus.

In regards to the secondary line release 8, this is also preferably made of stainless steel wire. Winding 22 of secondary line release has a core diameter of about 3 times the diameter of wire 10 so that the secondary line release 8, can freely slide the length of rigid wire 10.

Nylon material having a hardness of 119R—(Rockwell) is preferred for the discs 15 and 16.

This invention can be further described as downrigger fishing line release apparatus comprising a primary fishing line release wherein the improvement comprises a secondary line release apparatus consisting of secondary line release eye 8, and line release leg 13 of line release eye 8, extending through eye release loop 12 and line release loop 12 flexing beyond end of line release leg 13, on applied force of fish on fishing line 5.

Further description of this invention is for downrigger fishing line release apparatus comprising a primary fishing line loop release apparatus 9, wherein the improvement comprises a secondary fishing line release apparatus consisting of a line release eye 8 freely slidable on primary fishing line release wire 10 and secondary line release loop 12 on one leg of the line release eye 8 and secondary line release leg 13 of the line release eye 8, extending through the line release loop 12, and the line release loop 12 to flex beyond the end of secondary line release leg 13 extending through line release loop 12, when force is applied outward by fishing line at site of line release loop 12.

Having described my invention, I claim:

1. Downrigger fishing line release apparatus comprising a primary fishing line loop release apparatus wherein the improvement comprises:
    (a) secondary fishing line release apparatus consisting of primary fishing line release wire and
    (b) secondary line release eye
    (c) freely slidable on said primary fishing line release wire, and
    (d) secondary line release loop on one leg of said line release eye, and
    (e) secondary line release leg of said line release eye extending through said secondary line release loop, and
    (f) secondary line release loop to flex beyond the end of secondary line release leg when force is applied outward by fishing line at site of line release loop.

* * * * *